No. 787,413. PATENTED APR. 18, 1905.
J. THOMAS.
COMPUTING APPARATUS FOR WEIGHING SCALES.
APPLICATION FILED MAR. 1, 1904.
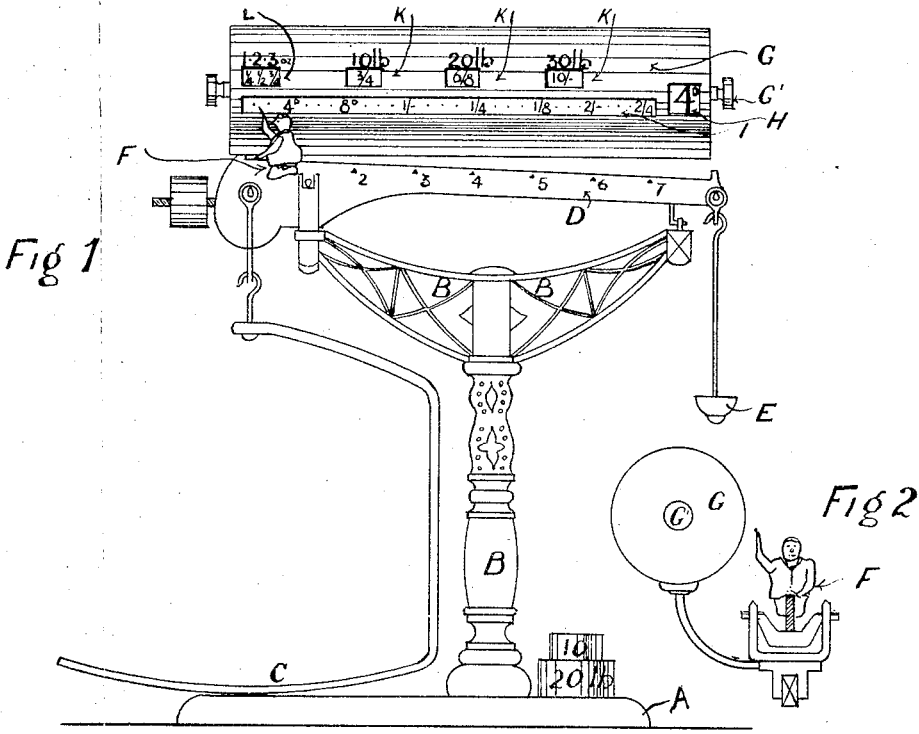

No. 787,413. Patented April 18, 1905.

UNITED STATES PATENT OFFICE.

JOHN THOMAS, OF SUMMER HILL, NEAR SYDNEY, NEW SOUTH WALES, AUSTRALIA, ASSIGNOR OF ONE-HALF TO ROBERT SANDS, OF SYDNEY, NEW SOUTH WALES, AUSTRALIA.

COMPUTING APPARATUS FOR WEIGHING-SCALES.

SPECIFICATION forming part of Letters Patent No. 787,413, dated April 18, 1905.

Application filed March 1, 1904. Serial No. 195,983.

*To all whom it may concern:*

Be it known that I, JOHN THOMAS, builder, a British subject, residing at No. 243 Liverpool road, Summer Hill, near Sydney, State of New South Wales, Commonwealth of Australia, have invented new and useful Improvements in Computing-Machines or Computing Apparatus for Weighing-Scales, of which the following is a specification.

My invention consists of an improved machine or apparatus adapted to indicate (within definite limits for each machine) the value of any quantum of weight which can be indicated by weighing-scales at a given rate per unit of weight, the apparatus being combined with the weighing-scales so that upon the weight of any substance being ascertained and shown upon the beam or at the counterpoise of the weighing-scales the value at the given rate is shown in horizontal lines or spaces on a cylinder, which can be fixed parallel to the beam or otherwise placed conveniently thereto.

My invention is carried out by means of a cylindrical drum or cover placed conveniently to the beam of the weighing-machine, inclosing a revolving cylinder bearing upon its surface a chart of figures, the cylindrical drum or cover having different apertures (or more than one slotted aperture) therein to show figures on the chart and the chart being so constructed as to show concurrently the values at a given rate of weights, which can be indicated on the beam of heavier weights placed at the counterpoise of the scale and of ounces or fractional parts not indicated on the scale.

My invention is illustrated in the accompanying drawings, in which—

Figure 1 represents an elevation of one of the weighing-scales as used by me in combination with the apparatus which is the subject of my invention. Fig. 2 is an end view of the cylinder with parts omitted and parts in section. Fig. 3 shows a portion of the chart constructed by me for the calculation of values at the rate shown in the right-hand margin.

In Fig. 1, A represents the base of the machine.

B B B represent the column or stand of the weighing-scales used by me, the same being constructed so as to receive on one side thereof a large-sized tray or basin C as a receptacle for the substances to be weighed.

D is a graduated beam in the weighing-scale; E, a fixed counterpoise of the usual type.

F is a sliding jockey-weight, which in the preferred form is a figure with one hand pointing to the scale of weights on the beam and the other to a scale of values shown above the beam.

G represents a cylindrical cover which incloses a revolving cylinder bearing upon its surface a chart of figures, as hereinafter mentioned.

G' shows the handle by which the internal cylinder is revolved.

H represents an aperture in the cylindrical cover showing therein the figure or figures representing the rate per pound, per quarter, or per ton, as the case may be, at which the weight has to be computed.

I is a slotted aperture in the cylindrical cover, showing therein the values at different weights as shown on the beam of the weighing-scales of the substances weighed at the rate shown at H.

K K K are additional apertures showing the value of the heavier weights, as ten, twenty pounds, or other weights, which may be placed on the counterpoise E.

L is a slotted aperture showing the values of one, two, or three ounces or other fractional parts in addition to one quarter or more quarters than one of a pound shown upon the beam.

A portion of the chart invented by me, which is affixed to the surface of the revolving cylinder, is shown in Fig. 3. It is so calculated and constructed that when fixed on the surface of the revolving cylinder it will show at the rate to be computed in the slotted aperture I the values of the different weights shown on the graduated beam, in the apertures K K K the values of the heavier weights, as ten, twenty pounds, or other weights provided for placed on the counterpoise of the scale and in the slotted aperture L the value of ounces or other fractions (in addition to the one-quarter or more than one-quarter of a pound appearing on the beam.) My invention in this respect is carried out in the following way: On one side or in a margin of the chart in a line horizontal with the figures to indicate the resulting values are placed the figures representing the rates at which the weight can be computed. Thus, taking the rate "four pence" appearing in the margin of the chart, the following resulting values are shown *seriatim* in a line therewith, the value for one-quarter pound, one-half pound, three-quarters of a pound, one pound, one and a quarter pounds, one and a half pounds, one and three-quarter pounds, two pounds, and so on. Three lines above in a line with the center of the figure in the margin representing the next rate in the chart the figures "¾" show the value of ten pounds at the rate given, and in the same horizontal line are figures showing the values of twenty pounds, thirty pounds, and so on, which will appear in the apertures K K K concurrently with the figures shown in the slotted aperture I of the cylindrical cover. In the same line with these figures for the heavier weights are given the values of one, two, or three ounces, which will appear concurrently in the slotted aperture L. The result of my calculations and experiments is to find that this construction of the chart is required to give the results attained. It need scarcely be said that the cylindrical cover must be so constructed that the space between the slotted aperture I and the apertures K K K therein must represent the space shown on the chart between the figures referred to or between any corresponding series.

The cylindrical drum or cover can be affixed to the weighing-scales by any suitable bearings.

When it is desired to use the apparatus, the handle of the cylinder is revolved until the rate required is shown in the aperture H. The substance being weighed, one hand of the figure will point to the weight indicated on the beam, the other hand to the resulting value at the given rate in the aperture I immediately above the beam, the values at the said rate of the heavier weights, such as ten, twenty, or other weights for which the chart is calculated in the apertures K K K, and the value at the rate of additional ounces or other fractions in the aperture L.

This computing machine or apparatus can be adapted so as to give any weights or any rates, (within definite limits for each machine,) and machines manufactured according to my invention can be constructed so as to meet particular or special requirements. The size of the revolving cylinder can be varied so as to carry upon its surface a chart of the size required to designate the rates likely to be required, according to the particular use or trade for which the weighing-scales and apparatus would be required.

My invention is applicable to all weighing-scales on the beam principle and not merely to scales of the particular construction shown in the drawings.

What I claim as my invention, and desire to secure by Letters Patent, is—

1. A weighing-scale comprising a revolving cylinder and an inclosing cylindrical cover G, in combination with a chart of figures fixed round the cylinder, the cylindrical cover having apertures therein, H I K K K, and L, so as to show concurrently by the figures on the chart the rate at which goods are charged and the values at such rate per pound, or other unit of weight representing pounds, ounces, or other fractions, which may be indicated on a graduated beam and also of heavier weights, which can be placed on a counterpoise of the scale; a graduated beam D for the weighing-scale having indicating-marks thereon, a counterpoise F connected to said beam adapted to receive weights; a handle G' to operate the revolving cylinder until the (charging) rate required is shown at aperture H, a poise F movable on the beam, the said chart being so constructed as to include in one line thereon the rate to be charged, and the values of pounds and fractions of a pound (corresponding with the divisions on the beam) and three lines above, figures showing the value of ounces, or other fractions, and of slip-weights on the poise, and being also so constructed that other values are presented in the intervening lines for different rates, upon the like plan, substantially as described.

2. A chart of figures, for use in combination with the cylinder of a computing apparatus for weighing-scales, having on the right-hand side thereof a perpendicular column of figures representing different rates to be charged for goods, a horizontal line of figures opposite each figure in the perpendicular line representing values at such rate for different weights, the figures in the horizontal line being half the size of the figure representing the rate and in a line with the lower portion of said figures, and horizontal lines of figures between the before-mentioned horizontal rows and opposite the upper portion of each figure in the perpendicular column, showing the values of one, two and three ounces at the given rate, substantially as described.

3. A chart of figures, for use in combination with the cylinder of a computing apparatus for weighing-scales, having on the right-hand side thereof a perpendicular column of figures representing different rates to be charged for goods, a horizontal line of figures opposite each figure in the perpendicular line representing values at such rate for different weights, the figures in the horizontal line being half the size of the figure representing the rate and in a line with the lower portion of said figures, horizontal lines of figures between the before-mentioned horizontal rows and opposite the upper portion of each figure in the perpendicular column, showing the values of one, two and three ounces at the given rate, and at intervals along the same line figures showing the values of bigger weights, substantially as described.

In testimony whereof I have signed my name to this specification in the presence of two subscribing witnesses.

JOHN THOMAS.

Witnesses:
   ALFRED DE LISSA,
   ARTHUR E. GOODIN.